United States Patent

Schultz et al.

[11] 3,838,279
[45] Sept. 24, 1974

[54] DETERMINATION OF BOREHOLE WASHOUT BY USE OF INELASTIC NEUTRON SCATTERING GAMMA RAY MEASUREMENTS

[75] Inventors: Ward E. Schultz; Harry D. Smith, Jr., both of Houston, Tex.

[73] Assignee: Texaco Inc., New York, N.Y.

[22] Filed: Apr. 3, 1973

[21] Appl. No.: 347,518

[52] U.S. Cl................................. 250/270, 250/369
[51] Int. Cl............................................. G01v 5/00
[58] Field of Search........................... 250/369, 370

[56] References Cited
UNITED STATES PATENTS
3,484,609  12/1969  Pritchett et al..................... 250/270
3,521,064   7/1970  Moran et al..................... 250/269 X
3,691,378   9/1972  Hopkinson et al.............. 250/270 X Primary Examiner—Archie R. Borchelt
Attorney, Agent, or Firm—T. H. Whaley; C. G. Ries

[57] ABSTRACT

An illustrative embodiment of the invention provides a method for locating zones of borehole washout behind the casing in a cased well borehole. The formations in the vicinity of the borehole are repetitively irradiated with short duration bursts of fast neutrons. Gamma rays produced by the inelastic scattering of the fast neutrons are observed in at least four different energy regions in the gamma ray spectrum and are corrected for any lingering thermal neutron capture gamma ray background. The four energy regions include inelastic scattering gamma rays from carbon, oxygen, silicon and calcium. A first output signal related to the porosity (hydrogen index) is derived by summing the inelastic gamma rays in all four energy regions. Second and third output signals are formed by taking the carbon/oxygen and silicon/calcium ratio signals. The three output signals are then combined according to predetermined empirically derived relationships to produce an estimate of the location of zones of borehole washout behind the casing.

5 Claims, 5 Drawing Figures

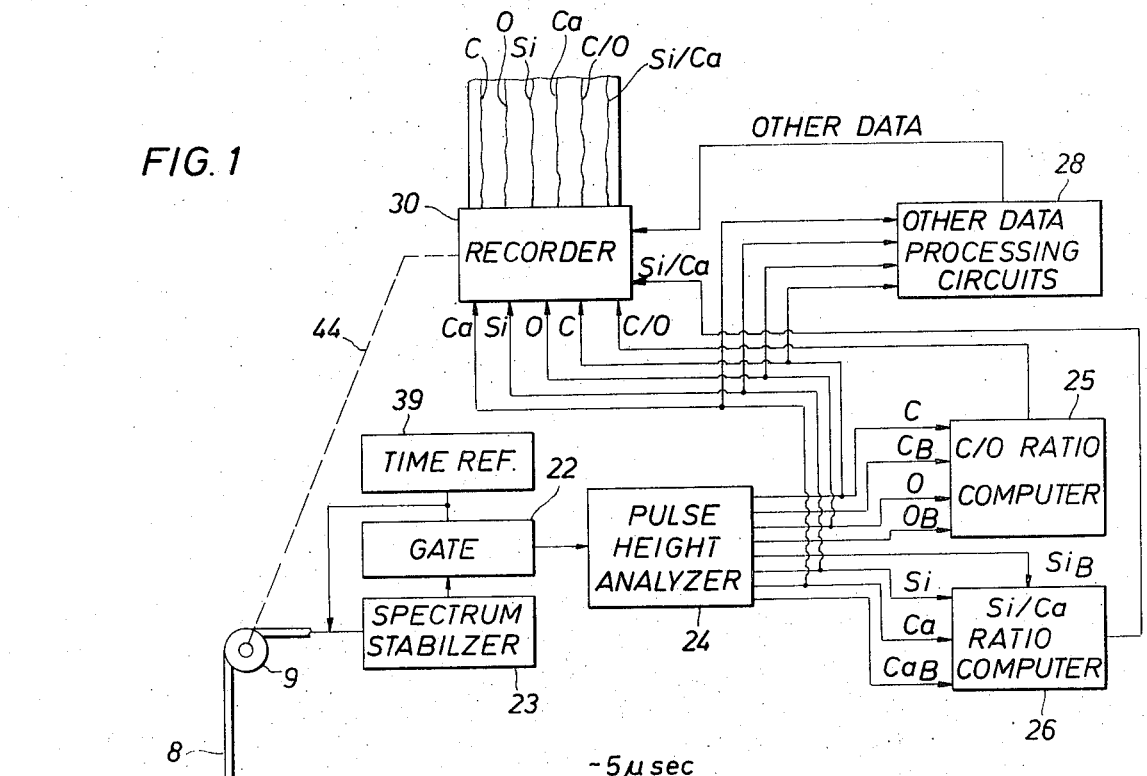
FIG. 1
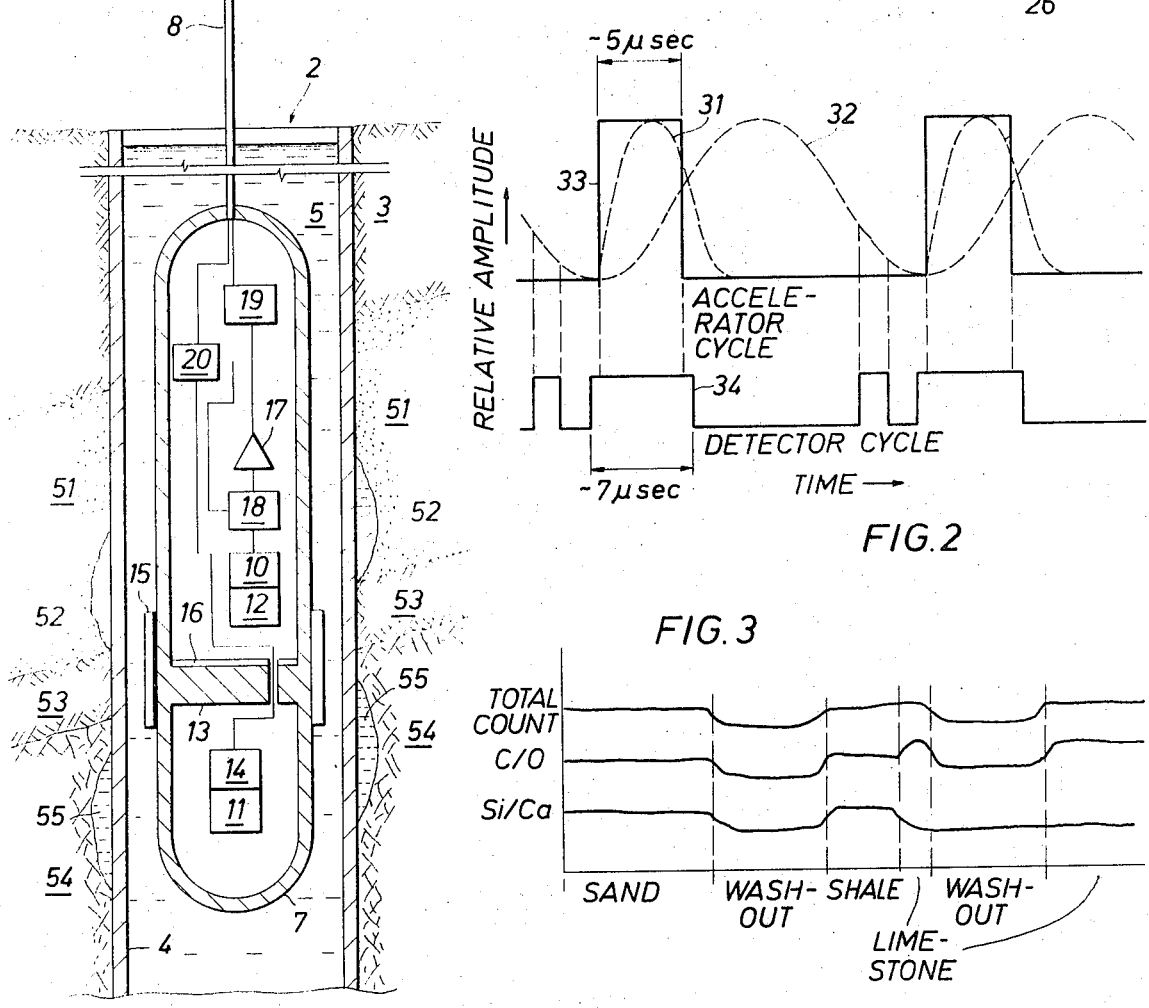
FIG. 2
FIG. 3

DETERMINATION OF BOREHOLE WASHOUT BY USE OF INELASTIC NEUTRON SCATTERING GAMMA RAY MEASUREMENTS

BACKGROUND OF THE INVENTION

This invention relates to radiological well logging methods for investigating the characteristics of subsurface earth formations traversed by a borehole and, more particularly, relates to improved fast neutron inelastic scattering well logging methods.

It is well known that oil and gas are more likely to be found in commercially recoverable quantities from those earth formations which are relatively porous and permeable than in more highly consolidated earth formations. It is also well known that oil or gas producing formations may be located by passing a neutron source through a borehole and measuring the intensity of secondary gamma ray radiation developing from the neutron irradiation as a function of borehole depth.

Neutron lifetime or thermal neutron decay time well logs have been used in the prior art in cased well boreholes to indicate the presence of salt water bearing earth formations behind the casing. In many areas of the world, however, oil pay sands are located nearer the surface in a well which has currently producing deeper oil horizons. In the prior art techniques of thermal decay time or neutron lifetime logging it is difficult to distinguish oil bearing earth formations from earth formations containing fresh water. As the hydrocarbon has a significant content of hydrogen and as water also has a significant hydrogen content, their response to slowing down neutrons from a fast neutron source is very similar.

In copending U.S. Pat. applications, Ser. Nos. 182,035, filed Sept. 20, 1971; 182,036, filed Sept. 20, 1971 and 182,037, filed Sept. 20, 1971, methods and apparatus for distinguishing hydrocarbon bearing formations from fresh water bearing formations are disclosed. As previously mentioned these techniques are largely useful in the near surface portions of cased well bores in attempts to discover and exploit new producing horizons of hydrocarbon. A difficulty which is encountered in the interpretation of carbon/oxygen logging systems such as those disclosed in the aforementioned patent applications has been that regions of borehole washout which occur above the cement top in a cased well bore can appear, because of their liquid water content, to be more porous and permeable than they actually are in occurrence. These regions of borehole washout wherein formation fluids can fill up an annular area immediately adjacent to the casing above the cement top in a cased well bore because of high porosity and unconsolidated formations encountered in the drilling process. In general, the harder and more consolidated a formation the more nearly perfectly round borehole is achieved through such a formation in the drilling process. If a loosely consolidated sand formation is encountered, for example, in the drilling process fluids from the formation and from the drilling fluid itself can cause an area larger than the diameter of the drilling bit to wash out or cave in along the walls of a borehole. When the casing is later inserted into the borehole then a washed-out pocket or annular space is formed which in the passage of time will generally fill up with formation fluids such as fresh water or hydrocarbon. These areas have been confusing in the interpretation of the carbon/oxygen logging systems of the previously mentioned copending patent applications. The present invention encompasses techniques for detecting such washed-out regions in the annulus between the casing and formation above the cement top in a cased well borehole and for correcting the interpretation of other hydrocarbon logs for these effects.

The above features and advantages of the present invention are provided in a pulsed inelastic neutron scattering well logging system utilizing energy and time gating techniques to examine a portion of the gamma ray spectrum of scattered fast neutrons from the earth formations surrounding a cased well borehole. In the system of the present invention a source of 14 MEV fast neutrons is supplied which operates in a pulsed mode. The fast neutrons produced from the source cause the emission of gamma rays of characteristic energies when inelastically scattered from certain elements contained in the earth formations surrounding the cased well borehole. The inelastic scattering gamma rays (henceforth referred to as inelastic gamma rays) are examined in at least four separate energy channels, bands or regions in the gamma ray spectrum. The lithological characteristics of the earth formations surrounding a cased well borehole influence the number of gamma rays produced in each of the at least four selected energy regions. Observations of the total count rate in all four of the energy regions can give indications of formation porosity. Examination of the amplitudes of selected ratios of counts in pairs of the four selected energy regions can give lithological information as well as information pertaining to the amount of borehole washout in the annulus surrounding the casing when properly interpreted. In the present invention relationships have been established which enable the estimation and identification of borehole washout surrounding the casing by the use of selected amplitude ratios of the counts in pairs of the four energy regions being examined. This estimation of the existence of borehole washouts can then be used to assist in and correct the interpretation of the other formation lithological and porosity characteristics.

The above and other objects, features and advantages of the invention are pointed out with particularity in the appended claims. The invention is best understood by taking the following detailed description thereof in conjunction the appended drawings in which:

BRIEF DESCRIPTION OF THE DRAWINGS

FIG. 1 is an overall schematic block diagram of a well logging system in accordance with the invention.

FIG. 2 is a timing diagram showing the relationship of accelerator and detector on-time with respect to gamma rays caused by the inelastic scattering of neutrons and thermal neutrons in the vicinity of the detector in the borehole.

FIG. 3 is a schematic presentation of the amplitude ratios of a pair of gamma ray count ratio signals and the total count signal produced by the apparatus of FIG. 1 in the schematic borehole of FIG. 1.

DESCRIPTION OF THE PREFERRED EMBODIMENT

Figures 4, 5:
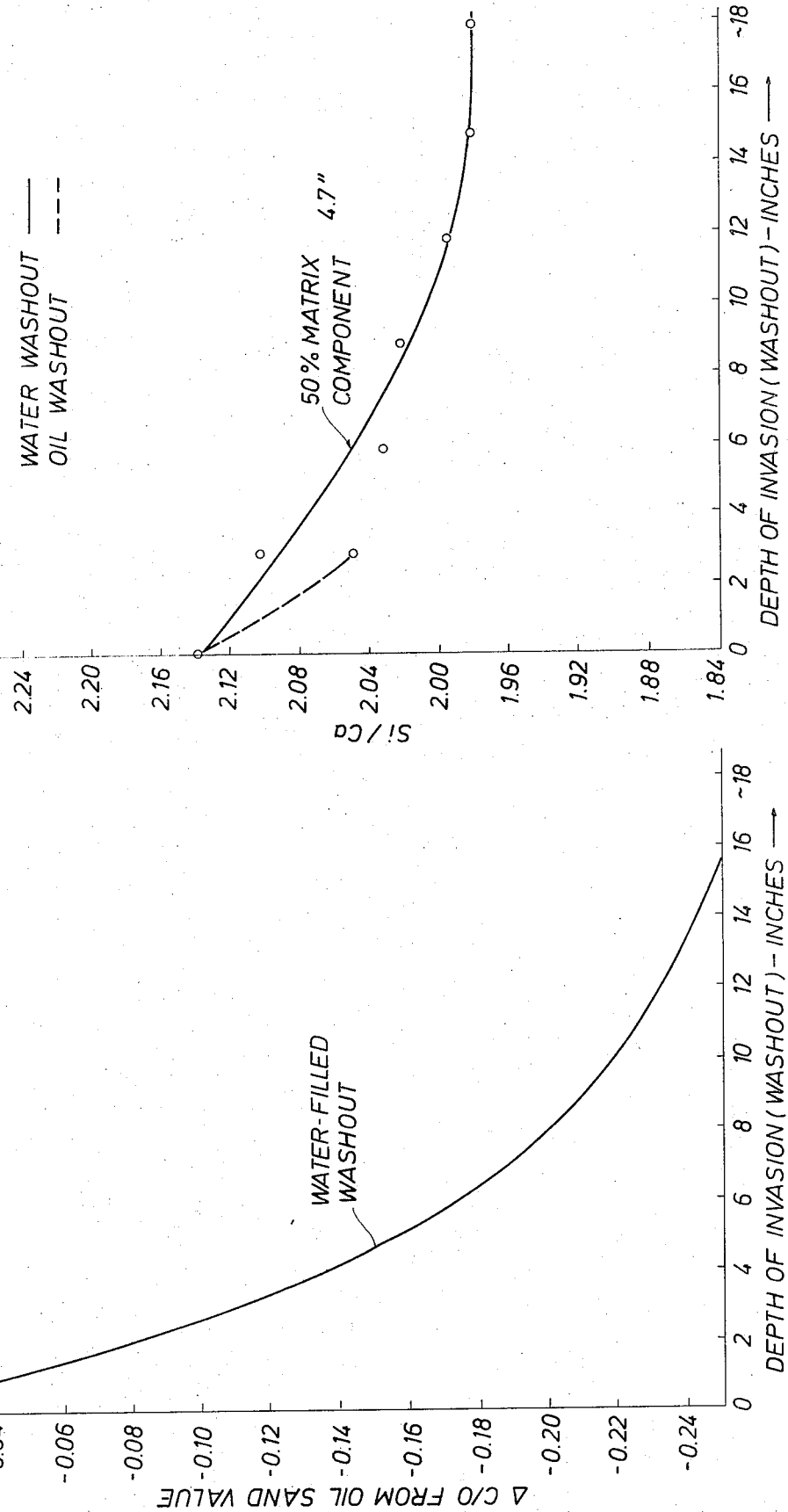
FIG. 4 is a graphical representation illustrating the change in a selected amplitude ratio in a formation of constant porosity and plotted as a function of the amount of borehole washout in the annulus behind the casing.
FIG. 5 is the graphical representation showing the change of a second ratio of selected amplitude measurements also plotted as a function of borehole washout in a formation of constant porosity.

Referring initially to FIG. 1 there may be seen a simplified functional representation in the form of a block diagram of well logging apparatus in accordance with the invention. A borehole 2 is shown penetrating earth formations 3 and lined with a steel casing 4 and filled with a well fluid 5. The casing 4 is cemented in place in the regions of current oil production (not shown) and perforated to allow the produced formation fluids to flow therethrough. In the portion of the penetrated earth formations shown above the cement top, the casing 4 penetrates a sand zone 51 having a washed out region 52 filled with formation fluid (assumed to be water in this example). The casing then penetrates a shale zone (clay) 53 and a loosely consolidated limestone layer 54 having a washed out region 55 (also assumed to be water filled in this example). The operation of the well logging sonde 7 with respect to these two borehole washout zones and the formations 51, 53 and 54 will be discussed in more detail subsequently.

The downhole portion of the logging system may be seen to be basically composed of an elongated fluid tight hollow body member or sonde 7 which during the logging operation is passed longitudinally through the casing 4 and is sized for passage therethrough. Surface instrumentation whose function will be discussed in more detail subsequently is shown for processing and recording electrical measurements provided by the sonde 7. A well logging cable 8 which passes over a sheave wheel 9 supports the sonde 7 in the borehole and also provides a communication path for electrical signals to and from the surface equipment and the sonde 7. This cable 8 may be of a conventional armored well logging type and may have one or more electrical conductors for transmitting such signals between the sonde 7 and the surface apparatus.

The sonde 7 contains a source of high energy neutrons 11. The neutron source contemplated for use herein is a pulsed neutron source operating from the principle of the deuterium-tritium reaction. However, it will be appreciated by those skilled in the art that other types of pulsed neutron sources may be used if desired.

A suitable radiation detector is provided in the downhole sonde 7 comprising a photomultiplier tube 10 and a detector crystal 12 for detecting gamma ray radiation resulting from the inelastic scattering of high energy neutrons by the earth formations 3 surrounding the cased well borehole. A radiation shield 13 of iron, lead, paraffin, or other suitable material is interposed between the neutron accelerator 11 and the crystal detector 12 of the apparatus. The detector crystal 12 may comprise a thallium doped sodium iodide, cesium iodide or other like activated material. This crystal is optically coupled to a photomultiplier tube 10. Additionally a thermal neutron shielding sleeve 15 may be provided as shown in FIG. 1 about the detector crystal 12. This shielding sleeve may be placed on either the interior or exterior wall portion of the sonde 7. A thermal neutron shielding disk 16 is interposed between the radiation shielding material 13 and the detector crystal 12 to reduce the probability of thermal neutrons from reaching the detector crystal and causing activation of the iodine therein.

The radiation shielding 13 reduces the probability of direct irradiation of the detector crystal by neutrons emitted from the neutron source accelerator 11. The thermal neutron shielding disk 16 and cylinder 15 surrounding the detector crystal 12 may be comprised of boron or any other suitable material which has a high thermal neutron capture cross section. This shield serves to further reduce the possibility of thermal neutrons which follow a tortuous path and have been slowed by the borehole fluid 5 or the shielding material 13 from reaching the vicinity of the detector crystal and possibly causing neutron activation of the iodine or other elements comprising the crystal. Moreover, the thermal neutron shield reduces the probability of neutrons from a previous accelerator pulse interacting with materials in the sonde 7 itself or the crystal 12 itself thus causing the emission of thermal capture gamma radiation during the time period when inelastic scattering gamma rays are being observed. In spite of this shielding some lingering thermal neutrons will perhaps still be present in the vicinity of the detector crystal 12 when the inelastic scattering gamma rays are being observed. This can cause thermal capture gamma radiation to be emitted during this interval. It is therefore desirable to provide some means for correcting for this thermal neutron background gamma radiation in the operation of the apparatus. A technique such as that disclosed in the copending U.S. Pat. application, Ser. No. 182,035, filed Sept. 20, 1971 and assigned to the assignee of the present invention may be used for this purpose.

As well known in the art the scintillation crystal 12 produces a discrete light flash whenever a gamma ray passes therethrough and exchanges energy with the crystal lattice structure of the detector crystal 12. The photomultiplier tube 10 generates a current pulse which may be converted into a voltage pulse in a conventional manner which is proportional in height to the intensity of each such light flash or scintillation which occurs in the crystal 12. The intensity of such scintillations is functionally related to the energy of the gamma ray causing the light flash. Thus, the photomultiplier tube 10 generates voltage pulses having amplitudes proportional to the energy of the gamma rays causing the scintillations. These proportional amplitude voltage pulses produced by the tube 10 comprise a detector signal which is supplied to a linear amplifier 17 via a discriminator 18. The discriminator 18 may be used if desired to discriminate, for example, against low energy background gamma radiation produced, for example, by Compton scattering of higher energy gamma ray components or by the natural gamma radiation emitted by the earth formation materials 3 surrounding the well bore. A preset bias level may be used to pass only pulses from the photomultiplier 10 which exceed a predetermined height. The elimination of pulses due to these low energy background gamma rays contributes to the overall counting accuracy and statistical accuracy of the system by eliminating problems due to pulse pile-up or instantaneous counting rate limitations placed upon the counting system by the electronic circuitry components thereof.

The neutron accelerator 11 is preferably operated by a pulsing circuit 14 which may be of conventional design as known in the art. The pulsing circuit 14 which functions to operate the accelerator 11 in short duration pulses may be controlled by timing pulses from a surface timing reference 39 which are communicated over the cable 8 conductors. The timing reference 39 could be situated in the downhole sonde, if desired. Timing signals from the timing reference 39 are also supplied to a downhole reference pulser 20. For example, the pulsing circuit 14 could be activated by a timing pulse from the time reference 39 to emit a neutron burst of a specified relatively short time duration. The frequency of such relatively short duration neutron bursts would then be controlled by the frequency of the timing reference 39. In the inelastic neutron scattering measurements contemplated in the present invention, it is desirable to use a very narrow neutron pulse having a time width of about 5 microseconds and which pulses are repeated at intervals of approximately 5,000 to 20,000 or more times per second.

Referring now to FIG. 2 the relative time relationship of the neutron pulses just discussed to the operative portion of the gamma ray detection cycle into the high energy and thermal neutron populations are shown. The accelerator cycle is represented by the solid curve 33. The inelastic gamma ray population in the vicinity of the detector crystal 12 is represented by the dashed curve 31. The thermal neutron capture gamma ray population in the vicinity of the detector 12 is shown by the dotted line curve 32. The operative detector cycle is represented by the separate solid line curve 34.

It will be noted from FIG. 2 that there is a rapid build up of the inelastic gamma ray population curve 31 and that this population is essentially present only during the neutron burst or pulse. The thermal neutron capture gamma ray population curve 32 builds up much slower due to the fact that a time interval is required to allow slowing down of the neutrons, and this curve reaches a peak only after the cessation of the 5 microseconds duration neutron pulse. However, there may be some component of the thermal neutron population from the previous pulse still in the vicinity of the detector crystal at the beginning of the next neutron pulse. This would comprise the thermal neutron background gamma ray population spoken of previously. This can particularly be a problem at high neutron pulse repetition rates. The boron thermal neutron shielding material 15 and disk 16 rapidly absorb many such thermal neutrons in the vicinity of the detector crystal but a small background component in general can still be present. By using the techniques described in the aforementioned copending patent application the detector (10, 12) is gated on for a relatively short time duration just prior to the portion of its operating cycle coinciding with the accelerator operating cycle to provide a count of the thermal neutron capture gamma rays present as background in the vicinity of the detector crystal 12 just prior to commencing the next pulse of accelerator 11. These thermal capture background gamma ray pulses may then be effectively removed from the detector signal during the accelerator pulse by subtraction. For this method to be effective, of course, the relatively narrow time gate for background counting just prior to the inelastic gamma ray measurement cycle must be as close thereto in time as is practicable.

Referring again to FIG. 1 and bearing in mind the timing sequence of FIG. 2 it will be observed that during the time the neutron accelerator 11 is activated the output signals from the photomultiplier 10 are conducted via the discriminator 18 and linear amplifier 17 to a cable driver circuit 19 which may be of conventional design as known in the art. A reference signal having a known amplitude is also supplied by pulser 20 to the input of the discriminator 18. This reference pulse provided by the downhole pulser 20 can be utilized in a gain control system or spectrum stabilizer 23 located at the surface to control the overall gain of the system and thus provide system linearity. Of course, other gain control techniques than the use of reference amplitude pulser could be utilized if desired. For example, the location of known energy peaks in a gamma ray spectrum could be monitored and used to correct the system gain to center the known energy peak in its proper location in its spectrum. The operation of all such gain control stabilization techniques are contemplated to fall within the scope of the invention.

Since both the downhole pulse generator 14 and the surface gate 22 which controls the time selection of the data pulses from the downhole sonde 7 are timed with the same timing reference 39, it is apparent that synchronism may be maintained between the surface equipment and the downhole equipment. Thus, the data signals may be gated in such a manner upon their arrival at the surface to select portions thereof for processing which are timed as desired relative to the emission of the neutron burst in the manner as described with respect to FIG. 2.

Although not specifically depicted in FIG. 1 it will be understood by those skilled in the art that electrical power may be supplied from a surface power source (not shown) via the well logging cable 8 to the downhole sonde 7. Suitable power supplies (not shown) are also provided in the downhole sonde 7 for operating the downhole electronic portion of the equipment.

Output signals from the time gate 22 comprise a sequence of count pulses resulting from gamma rays detected by the detector crystal 12 and photomultiplier tube 10 during the time interval that the neutron accelerator 11 is activated. Also, background gamma radiation from the thermal capture gamma rays previously discussed is supplied in the time gate interval just prior to each of the neutron accelerator activation intervals. The inelastic gamma ray data pulses and the background gamma ray pulses are supplied to a pulse height analyzer 24.

Pulse height analyzer 24 may be of conventional design and may have, for example, four or more energy channels or divisions corresponding to quanitizations of the pulse height of the input pulses. The pulse height analyzer 24 functions to sort and accumulate a running total of the incoming pulses into a plurality of storage channels based on the height of the incoming pulses. These energy channels are directly related to the energy of the gamma ray causing the pulse. The output of the pulse height analyzer 24 in the case of the present invention consists of a number of count pulses occurring in each of the four preselected energy ranges or windows corresponding to carbon, oxygen, silicon, and calcium during each of the two detector on cycle intervals. The background gamma ray pulses are labeled $C_B$, $O_B$, $Si_B$, $Ca_B$ in FIG. 1. The inelastic gamma ray counts are labeled C, O, Si, Ca in FIG. 1. In the practice of the method of the invention it has been found preferable to use a carbon energy window in pulse height analyzer 24 which extends from approximately 3.17 to 4.65 MEV. The oxygen energy window is chosen to extend from approximately 4.86 to 6.34 MEV. The silicon window is chosen to extend from approximately 1.65 to 1.86 MEV. The calcium energy window is chosen to extend from approximately 2.5 to 3.3 MEV. By using this choice of energy windows the 4.44 MEV carbon inelastic gamma ray peak and the 6.13 MEV oxygen inelastic gamma ray peak are covered together with their corresponding single and double pair production escape peaks. The optimal choice of energy range for the silicon window encompasses the 1.78 MEV photopeak for silicon. The calcium energy window, however, does not encompass the 3.73 MEV calcium photopeak due to interference from the carbon peak. However, this energy window does encompass the corresponding single and double escape peaks from the 3.73 MEV calcium photopeak. It will be understood by those skilled in the art that slight variations in the placement of these energy windows can be made if desired without compromising the inventive concepts.

The number of counts occurring in each of the four energy windows during the two time intervals that the downhole detector signals are supplied to the pulse height analyzer via gate 22, are output from the pulse height analyzer as eight separate digital signals labeled as previously described in FIG. 1. The four signals representing the carbon, oxygen, silicon, and calcium inelastic gamma ray counts are supplied to a recorder 30 which is driven as a function of borehole depth either electrically or mechanically by the sheave wheel 9 as illustrated by the dotted line 44. These four separate signals may thus be plotted as a function of borehole depth as illustrated in FIG. 1. Moreover, these four signals may be supplied along with the corresponding background signals from these energy windows to other data processing circuits 28 for determination of water saturation, porosity or other data of interest with respect to the well being logged.

In addition, the eight output signals from the pulse height analyzer 24 are supplied to carbon/oxygen ratio computer 25 and silicon/calcium ratio computer 26. In these computers the background subtraction is performed and the ratios formed. Output signals from the computers 25 and 26 compensated for the background thermal gamma radiation as previously described are supplied to the recorder 30 and used to drive separate tracks of the recorder as illustrated in FIG. 1.

Measurements made under test conditions using a well logging system such as that illustrated in FIG. 1 have been utilized to obtain plots such as those shown in FIGS. 4 and 5 of the depth of investigation of such a well logging system as a function of the amount of borehole washout present behind the casing in a cased well bore. The results of such investigations in addition to being illustrated graphically in FIGS. 4 and 5 are illustrated in the following table.

TABLE I

| Lithology | C/O | Si/Ca |
| --- | --- | --- |
| Water Sand (or shale) | 1.64 | 2.14 |
| Oil Sand (or shale) | 1.79 | 2.14 |

TABLE I-Continued

| Lithology | C/O | Si/Ca |
| --- | --- | --- |
| Water Lime | 1.78 | 1.92 |
| 100% Water | 1.45 | 1.92 |
| 100% Oil | 3.00 | 1.92 |

From the data of Table I, it can be seen that a water-filled washout in a primarily siliceous or clay matrix is unambiguously characterized by simultaneous decreases in both the carbon/oxygen and silicon/calcium ratios. In a siliceous material such as sandstone a large decrease in the carbon/oxygen ratio would occur in a water-filled washout for a given formation porosity with a simultaneous decrease in the silicon/calcium ratio, as the depth of invasion or borehole washout is increased in the manner illustrated in the graphs of FIGS. 4 and 5. This provides a technique for identifying borehole washout conditions behind the casing in such formations with the use of the apparatus described in FIG. 1.

Referring now to FIG. 3 and imagining the well logging tool of FIG. 1 being moved upwardly in the borehole 2 past earth formations 54, 53 and 51 having water-filled washed out zones 55 and 52 therein, a well log such as that illustrated schematically in FIG. 3 could result. It will be observed that as the tool is moved through the limestone formation 54 that the total count (porosity) rate remains about constant until the fluid filled washout 55 is encountered. At this point the influence of the high hydrogen content fluid filling the washout 55 causes a sharp decrease in the inelastic gamma ray population because of the fast thermalization of the neutrons by the fluid. Simultaneously with this the C/O ratio (which is ordinarily high in a carbonaceous formation) also takes a sharp dip. The Si/Ca ratio (which is normally lower in a carbonaceous formation) remains lower in the washout region as indicated by the data in Table I.

In the shale zone 53 all three curves (Si/Ca, C/O and total count) remain about constant as they normally would. Upon entry into the washout 52 in the sand zone 51 the total count curve (porosity indicator) takes a sharp dip. In this region the C/O curve also takes a sharp dip as indicated by the data in Table I. The Si/Ca ratio (which ordinarily would be relatively higher in a siliceous zone) takes a sharp dip in the washout 52 region but returns to its normally greater value upon entry into the sand zone 51.

Using the logs of Si/Ca and C/O of FIG. 3 in conjunction with the calibration graphs of FIGS. 4 and 5 and hydrogen index information which is available from the total count rate in all four windows in the pulse height analyzer, it is then possible to derive estimates of the actual volume of material washed out. This can be done by using the magnitude of the changes in the appropriate carbon/oxygen and silicon/calcium ratios in the washed out regions 55 and 52 of the borehole. Larger magnitude changes in the amplitude of the carbon/oxygen and silicon/calcium ratios correspond to larger volumes of washout or extrusion of the formation fluid into the washed out region surrounding the casing. In this manner, then estimates of the conditions behind the casing 4 may be made on the basis of the magnitude of the amplitude changes in the carbon/oxygen and silicon/calcium ratio signals recorded on the recorder 30 of FIG. 1.

Summarizing, the techniques of the present invention include observing individual inelastic counting rates in calcium, silicon, oxygen, and carbon energy windows together with background removal by the observation just prior to the accelerator cycle in the same energy windows of the thermal neutron background population. The background corrected signals are utilized to derive carbon/oxygen and silicon/calcium ratio signals which are supplied to a recorder and recorded as a function of borehole depth. The formation condition behind the casing with respect to borehole washout may be estimated by observing the hydrogen index as determined by the sum of the count rates in all four of the energy windows. Experimentally derived calibration charts are provided which enable an estimation in a quantitative sense of the amount of borehole washout based on the magnitude of these amplitude variations in the carbon/oxygen and silicon/calcium ratios.

The disclosed method may make other alternative arrangements apparent to those skilled in the art. It is therefore the aim of the appended claims to cover all such changes and modifications as fall within the true spirit and scope of the invention.

We claim:

1. A method for detecting borehole washout conditions behind the casing above the cement top in a cased well borehole comprising the steps of:

irradiating the earth formations in the vicinity of the well borehole with repetitive, relatively short duration, bursts of high energy neutrons;

detecting, just prior to each such repetitive neutron burst, the background gamma radiation due to lingering thermal neutron population in the vicinity of the irradiated earth formations in at least four different energy regions in the gamma ray spectrum, and generating signals representative thereof;

detecting, during each such repetitive neutron burst, gamma radiations attributable to the inelastic scattering of fast neutrons in said at least four different energy regions in the gamma ray spectrum and generating signals representative thereof;

removing said background radiation from said inelastic scattering gamma radiation by subtracting said representative signals in each of said at least four energy regions to produce signals representative of at least four background corrected inelastic gamma ray measurements in said at least four energy regions;

generating a first output signal representative of the hydrogen index of the irradiated formations by summing said at least four background corrected signals and generating a signal representative thereof;

generating second and third output signals by forming ratios of selected pairs of said representative signals of at least four background corrected inelastic gamma ray measurements; and combining said first, second and third output signals according to a predetermined functional relationship to derive an estimate of the presence of borehole washout regions behind the casing.

2. The method of claim 1 wherein said fourth different energy regions in the gamma ray energy spectrum include regions chosen to encompass primarily gamma rays produced by the inelastic scattering of high energy neutrons by the elements carbon, oxygen, silicon, and calcium.

3. The method of claim 2 wherein said chosen energy regions are approximately 3.17 to 4.65 MEV for carbon, approximately 4.86 to 6.34 MEV for oxygen, approximately 1.65 to 1.86 MEV for silicon and approximately 2.50 to 3.30 MEV for calcium.

4. The method of claim 1 wherein said second and third output signals are formed by forming ratios of said representative signals of said background corrected measurements of carbon to oxygen and silicon to calcium respectively.

5. The method of claim 4 wherein said combining step comprises the additional steps of determining the hydrogen index of the irradiated zone by measuring said first output signal and then comparing, for this hydrogen index, the magnitude of said second and third output signals with a predetermined pair of empirically derived functional relationships which relate said second and third output signals to the depth of borehole washout for a given hydrogen index.

* * * * *